Patented July 5, 1938

2,122,826

UNITED STATES PATENT OFFICE 2,122,826

TREATMENT OF UNSATURATED COMPOUNDS

Adrianus Johannes van Peski, Amsterdam, Netherlands, assignor to Shell Development Company, San Francisco, Calif., a corporation of Delaware No Drawing. Application January 28, 1936, Serial No. 61,181. In the Netherlands February 16, 1935

12 Claims. (Cl. 260—2)

This invention relates to the production of commercially valuable products from unsaturated organic compounds, and it provides a process which comprises treating an unsaturated organic compound or a mixture comprising one or a plurality of species of unsaturated organic compounds with a suitable catalyst or activating agent, preferably an inorganic acid-acting halide or a complex catalyst comprising such a halide, under conditions at which polymerization and/or other additive reactions occur to form higher molecular weight products, and treating the mixture during the polymerization or after the polymerization reaction has substantially subsided with an oxidizing agent, preferably free oxygen, under oxidizing conditions, whereby said higher molecular weight products are converted to materials of commercial value as heavy oils, synthetic resins and resinous materials substantially soluble in most organic solvents, and in some cases to valuable organic oxy-compounds as carboxylic acids, hydroxy-carboxylic acids, ketones, aldehydes and the like.

A principal object of the invention is to provide a practical and economical process for the production of such useful products, particularly hydrocarbon soluble resins and resinous materials from unsaturated petroleum hydrocarbons or materials derived from petroleum or petroleum products; however, in accordance with the invention such valuable products may also be prepared from polymerizable unsaturated organic compounds of other types and from other sources.

The heavy oils, resins and resin-like materials which are obtainable in practical yields in accordance with the process are useful for a wide variety of purposes but they are of particular value as raw materials in the manufacture of waterproof coating materials as lacquers, varnishes and the like. They are substantially soluble in most organic solvents, particularly hydrocarbon solvents, and they are soluble in drying and semi-drying oils as linseed oil, stand-oil and the like and they do not retard the drying of such fatty oils and they therewith produce waterproof, clear, durable coating films when made into coating materials.

It is known that unsaturated organic compounds can be polymerized or condensed by the known methods to higher molecular weight products. However, the products obtained are in the great majority of cases insufficiently soluble in organic solvents, particularly fatty drying and semi-drying oils, as linseed oil, stand-oil, wood oil and the like. Accordingly, they are unsuitable for use in the manufacture of coating materials as resins. On the other hand, when the solubility of the resin or resinous material prepared by the known methods is such that a satisfactory solution or mixture with the drying or semi-drying oil is obtainable, such a mixture or solution is in many cases of little value as a coating material due to the fact that it is not sufficiently waterproof.

Now, in accordance with the present invention, higher molecular weight products, which are sufficiently soluble in fatty oils and which are particularly suitable raw materials for the manufacture of substantially waterproof lacquers and other coating materials, are obtainable by effecting their formation in the presence of an acid-acting halide polymerization catalyst, and subjecting them to an oxidation treatment with oxygen, oxygen-containing gas mixtures, or materials yielding oxygen under conditions of the oxidative treatment, if necessary or desirable in the presence of an oxidation catalyst, during or after the formation of the higher molecular weight bodies.

In the execution of the invention, substantially pure unsaturated organic compounds may be treated severally or mixtures containing a plurality of different unsaturated compounds as well as other substantially inert materials may be treated. Suitable unsaturated compounds which may be treated, or which may be comprised in the mixture treated, include among others ethylene and the secondary and tertiary base olefines as propylene, α-butylene, γ-butylene, the amylenes, hexylenes, heptylenes, octylenes, nonylenes and the like and their homologues and suitable substitution products. The term "olefine" as used herein and in the appended claims is intended to embrace those hydrocarbons possessing one olefinic double bond, said double linkage being between two aliphatic carbon atoms. Thus it is seen that the olefine copolymers as dipropylene, di-beta butylene, di-isobutylene, tri-isobutylene, the diamylenes, the dihexylenes and the like as well as the olefine interpolymerization products obtainable by the polymerization of an olefine with a dissimilar olefine are within the scope of the invention.

Other suitable unsaturated compounds which may be treated severally, in mixtures with each other or in mixtures comprising other unsaturated compounds are the conjugated double bond diolefines of straight chain or cyclic character. The straight chain butadiene, pentadiene, the hexadienes, the heptadienes, the branched chain compounds as 2-methyl butadiene-1,3, 2,3-dimethyl butadiene-1,3, 2-ethyl butadiene-1,3, 3-methyl pentadiene-2,4, 3,4-dimethyl pentadiene-2,4, the cyclic pentadienes, hexadienes, heptadienes and the like and their homologues and suitable substitution products are examples of conjugated double bond diolefines. The term "conjugated double bond diolefine" as used herein and in the appended claims embraces the open chain as well as cyclic diolefines containing the characteristic group C=C—C=C. The polyolefines as diallyl, the dibutenyls, dipentenyls and the like which do not contain conjugated double bonds may be treated severally or one or more of them may be present in the mixture treated.

The mixture treated may contain, in addition to other unsaturated compounds as olefines, diolefines and the like, aromatic compounds as benzene, toluene, xylene, phenanthrene, naphthalene, acenaphthalene, anthracene, fluorene and the like and such aromatic compounds which have been partially saturated by the addition of hydrogen thereto as dihydrobenzene, tetrahydrobenzene, tetrahydronaphthalene and the like as well as the homologues and suitable substitution products of such aromatic compounds. I may also treat severally or in mixtures unsaturated compounds characterized by possessing one or a plurality of alkenyl chains linked to an aromatic compound as styrene, phenyl-propylene, phenyl-butylene, naphthyl-ethylene and the like.

The unsaturated acids as acrylic, crotonic, cinnamic, oleic, ricinoleic, linoleic and the like and their ethers and esters, particularly their glycerides, are examples of unsaturated oxy-compounds to which the principles of my invention are applicable.

As a preferred embodiment of the invention, a mixture containing one or a plurality of conjugated double bond diolefines and one or a plurality of olefines may be treated, or the mixture may contain, in addition to one or more diolefines, one or more olefines as well as one or more aromatic compounds, or the mixture may be substantially devoid of olefines and comprise one or more conjugated double bond diolefines and one or more aromatic compounds.

The initial materials employed in the process need not be mono- or bi-molecular substances but the process may be carried out with polymerizable products which have already attained a certain degree of polymerization and may be further polymerized and converted to useful products in accordance with the invention.

Hydrocarbon mixtures containing, for example, conjugated double bond diolefines, olefines and/or aromatics, or particular fractions of such mixtures, may be advantageously treated. Such hydrocarbon mixtures are obtainable by the pyrogenesis or cracking of petroleum oils, shale oils, petroleum products, etc., and by the destructive distillation of coal, peat, pitches, waxes, asphalts, animal oils, vegetable oils and the like carbonaceous material. Cracked petroleum distillates or special fractions of cracked petroleum distillates are convenient sources of raw material for use in the process of the invention.

Certain fractions or cuts of petroleum and other hydrocarbon distillates may be treated per se or different fractions may be mixed in varying proportions depending upon their composition and the desired composition of the mixture to be treated, or varying proportions of relatively pure unsaturated compounds of any or all of the classes mentioned above, may be mixed with certain hydrocarbon fractions, as cracked distillate fractions, to provide satisfactory starting materials.

The hydrocarbon mixtures, which contain unsaturates, as cracked distillates, are conveniently fractionated into cuts or fractions containing hydrocarbons which contain, for the most part, the same number of carbon atoms to the molecule. Very satisfactory resins for use in the manufacture of waterproof coating materials may be produced from a fraction of cracked distillate boiling in the range of from about 25° C. to about 180° C. Such a fraction usually comprises in varying proportions, olefines as the amylenes and their homologues; conjugated double bond diolefines as isoprene and its homologues; cyclic olefines and diolefines as cyclohexene, cyclohexadiene, methyl cyclohexadiene, etc., and their homologues; and benzene and substituted aromatic hydrocarbons as toluene and xylene. Certain fractions obtainable from such a cracked distillate fraction may also produce valuable products when treated in accordance with the invention.

To accelerate the polymerization, condensation and other additive reactions whereby higher molecular weight products are formed from unsaturated organic compounds, I preferably carry out the reaction in the presence of an acid-acting inorganic halide or in the presence of an inorganic acid-acting halide in combination as a complex with an inorganic or organic compound. A suitable group of catalysts embraces the halides of the elements aluminum, boron, iron, tin, antimony, arsenic, bismuth, molybdenum, tungsten, vanadium, zinc, titanium, thorium, cerium, indium, thallium and the like. Other suitable catalysts include the acid-acting metal or boron halides in combination as complex compounds with inorganic or organic dipole moment compounds. The following are examples of suitable inorganic metallic halide complex catalysts: AlCl₃—NaCl, AlCl₃—BaCl₂, AlBr₃—KCl, AlCl₃—AgCl, AlF₃—NaCl, AlBr₃—AgBr, AlBr₃—BaBr₂, ZnCl₂—NaCl, ZnCl₂—CaCl₂, ZnBr₂—AgBr, FeCl₃—NaCl, SnCl₄—NaCl, BF₃—NaCl, BCl₃—NaCl and the like. The metallic halide may be in combination as a complex with an organic dipole moment compound, for example, an organic nitro-compound, a ketone, a carboxylic acid, an acid halide, a sulfone and other dipole moment organic compounds capable of forming a complex catalyst with an acid-acting boron or metal halide. A suitable group of complex catalysts of this type includes among others the following: AlCl₃-nitromethane, AlCl₃-nitrobenzene, AlCl₃-nitrobenzene-NaCl, AlCl₃-acetic acid, AlCl₃-acetone, AlCl₃-acetophenone, AlCl₃-benzophenone, AlCl₃-benzoyl chloride, AlCl₃-diphenyl sulphone, AlCl₃-dibenzyl sulfone, FeCl₃-nitrobenzene, FeCl₃-nitrobenzene-KCl, ZnCl₂-acetophenone, ZnCl₂-benzoyl chloride, BF₃-nitro-methane and the like.

The above-described complex catalysts may for the sake of convenience be represented by the general formula X—Y, wherein X represents an acid-acting metallic halide, and Y represents a neutral-acting metal halide or an organic oxy-compound as a ketone, sulfone, acid halide or organic nitro-compound.

The complex catalysts of the general formula X—Y are very advantageously employed when one of the unsaturated reactants is a conjugated double bond diolefine or when the mixture treated contains one or a plurality of conjugated double bond diolefines. Such complex catalysts accelerate the reaction or reactions to form useful products in accordance with the invention but their presence inhibits and in many cases substantially completely prevents the substantial formation of the relatively insoluble and in many cases useless conjugated double bond diolefine co-polymers.

The catalysts for use in the invention to form higher molecular weight products may be prepared and applied in any suitable manner. The catalysts may be used per se or mixtures comprising one or a plurality of different simple and/or complex catalysts may be used. The inorganic complex metal halide catalyst as AlCl₃—NaCl, for example, may be prepared by combining the two metal halides in the required amount, preferably in aqueous solution followed by evaporation to dryness. If desired, the metal halides may be combined in the presence of an organic solvent for them, and the solvent removed by distillation, evaporation, or other suitable means, or the complex catalyst may be applied in solution or suspension in a suitable organic liquid. Any of the above-mentioned catalysts may be used in admixture or deposited on suitable active or inert carrying materials. If desired, the catalysts may be used in conjunction with the hydrogen halides.

The complex catalysts of the type of AlCl₃-nitrobenzene, for example, may be prepared by combining a suitable acid-acting inorganic halide with an organic compound having a dipole moment. For example, an acid-acting metal or boron halide in the required amount may be dissolved in the dipole moment organic liquid. The complex catalyst formed may be soluble or insoluble in the organic medium. In the first case, the solution may be used or the complex compound may be more or less isolated therefrom, for example, by distillation or by extracting wholly or in part the excess of the organic liquid with a suitable extracting agent. The compound catalysts thus isolated may be used per se or dissolved or dispersed in another suitable liquid. A solid complex catalyst may be obtained when a metallic halide is combined with some dipole moment organic compounds. The complex compound AlCl₃-diphenyl sulfone is an example of such a solid complex catalyst. Such solid complex catalysts may be formed in a liquid medium and used suspended therein or separated therefrom and applied as a solid or dissolved or suspended in another suitable organic liquid.

As an example of a suitable method of executing the invention, the following procedure may be followed. A suitable unsaturated compound or a mixture comprising a plurality of unsaturated compounds may be charged to a suitable reaction vessel. A preferably employed reactor comprises a reaction kettle of the desired capacity equipped with means for heating its contents and preferably equipped with means for agitating its contents as by mechanical stirring. The reaction is preferably effected with the reactants in the liquid phase although vapor or vapor-liquid phase methods may be used when desired. The reactants in the desired proportions or fraction containing the reactants may be mixed before, during or after their introduction into the reaction vessel. The proportions of the unsaturated reactants present in the initial mixture treated may vary considerably depending upon the particular constituents to be reacted and to a certain extent on the characteristics of the product or products desired. When it is desired to react a conjugated double bond diolefine with an olefine and/or an aromatic compound and a complex catalyst as described is used, a substantial molecular excess of the conjugated double bond diolefine over the other unsaturated reactants may be employed. The reaction may or may not be effected in the presence of an organic solvent for the reactants and/or products or in the presence of a substantially inert diluent material. When hydrocarbon fractions containing unsaturated compounds are treated, the inert saturated hydrocarbons present may act as solvents or diluents. A substantially inert solvent as a saturated hydrocarbon or saturated hydrocarbon mixture as benzine, a saturated gasoline, a mixture of hexanes, octanes, etc., may be added to the reaction mixture to give a freely flowable mixture during the reaction, to assist in mixing, to afford better contact of the reactants with the catalyst or for other reasons, and any desired practical proportion of the solvent or diluent material may be used.

The catalyst may be added to the reaction mixture in any convenient manner as a solid in a powdered or granular form, or as a liquid, or suspended or dissolved in a suitable liquid medium. The catalyst may be added to the reactants all at once or continuously or intermittently over a certain period of time until the required amount is added. Since the reaction is in many cases exothermic, regulating the rate of addition of the catalyst may be a suitable means of controlling or aiding in the control of the reaction temperature within the desired limits.

The amount of the catalyst used may affect the characteristics of the higher molecular weight resin or resinous materials formed as well as the yield of such products. Accordingly, the proportion of the catalyst used in each particular case depending upon the particular reactants, upon the product or products desired, upon the particular catalyst, and upon the yield required in plant operation. In general, the desired results may be obtained by employing the catalysts in amounts of from about 0.2% to about 15% by weight of the total amount of the unsaturated materials to be reacted; however, greater or smaller quantities may be used when necessary or desirable.

The invention may be executed at any desired temperature and pressure. The temperature and pressure to be employed is dependent upon the materials reacted, the catalyst employed, upon the nature of the products desired, and may depend upon whether the oxidation treatment as herein described is applied during or after the polymerization and/or condensation treatment. When, for example, conjugated double bond diolefines are reacted with olefines and/or aromatic hydrocarbons, atmospheric pressure and temperatures of from about 20° C. to about 60° C. may be suitable, although higher temperatures and/or pressures may be used. Reaction at relatively high temperatures, for example, temperatures greater than about 65° C., may require the use of superatmospheric pressures to avoid undue volatilization and loss of reactants, solvents, products, etc.

During or after the formation of the higher molecular weight products by polymerization and/or condensation of the unsaturated organic compounds in the presence of acid-acting boron or metal halide simple or complex catalysts or mixtures of such catalysts, said product or products are subjected to an oxidation treatment in the presence of oxygen. The oxygen may be supplied in the required amount as oxygen per se or in the form of mixtures containing free oxygen, as air, or the reaction may be effected in the presence of agents supplying oxygen under the conditions of reaction, as peroxides, ozone, ozonides and the like. The oxidation treatment may be effected in any desired manner at any suitable temperatures and pressures in the presence or absence of suitable oxidation or oxygen-transferring catalysts or agents. Preferably the oxidation is effected at elevated temperatures, temperatures of from about 100° C. to 200° C. and higher being suitable in many cases. Atmospheric or superatmospheric pressures are in most cases suitable.

When necessary or desirable the oxidation treatment may be effected in the presence of oxidation catalysts or oxygen-transferring agents. Any suitable catalyst or agent of this type may be used. A particularly suitable class of catalysts embraces the heavy metal salts of the fatty, resinic and naphthenic acids, for example, the nickel, iron, cobalt, manganese, chromium, lead and the like salts of acids as linoleic, naphthenic and the like and organic acids derived from resins as pimaric, sapinic, colophonic, sylvic and the like. Good results are generally obtainable by employing, for example, compounds as cobalt linoleate, manganese resinate, manganese naphthenate and the like or mixtures of such salts. Another suitable group of oxygen-transferring catalysts embraces the heavy metal salts of sulphonic acids of organic compounds or mixtures of the same, such as the said salts of poly-nuclear aromatic sulphonic acids, for example naphthalene sulphonic acids and the like. The catalysts to accelerate the oxidation treatment may be used in varying amounts. Generally quantities of the catalyst equal to from about 0.1% to about 10% by weight of the higher molecular weight products are suitable.

The oxygen, oxygen-containing gas, or a suitable oxygen yielding material, may be charged to the initial reaction mixture, in any suitable manner, under conditions suitable for the oxidative treatment, while the unsaturated organic compounds are reacting to form higher molecular weight products. In accordance with this mode of operation, said higher molecular weight polymerization, condensation and the like products may be subjected to the oxidative treatment substantially as soon as they are formed. In some cases, as for example when it is desired to effect the oxidative treatment under conditions which may not be suitable for the polymerization and/or condensation of the unsaturated compounds, the invention is preferably executed by first effecting the polymerization and/or condensation under the desired conditions and then subjecting the resultant reaction mixture to the oxidative treatment under the desired conditions in the presence or in the absence of a suitable catalyst.

A special embodiment of my invention consists in that the oxidative treatment, both during or after the formation of the higher molecular weight products, can be controlled to obtain valuable products of predetermined characteristics. For example, under the milder conditions of the oxidative treatment, as by blowing air through the mixture containing the higher molecular weight reaction product or products for from about 30 hours to about 50 hours at a temperature of about 170° C., said products, without suffering any substantial breakdown, may be converted to valuable heavy oils, synthetic resins or resinous materials which are substantially soluble in most organic solvents and which form substantially waterproof coating materials with suitable solvents as drying and semi-drying oils. On the other hand, by employing more severe oxidizing conditions, for example by employing a temperature of about 170° C. or higher, and passing oxygen, or an oxygen-containing gas as air through the mixture for a relatively longer period of time, for example, about 150 hours to about 200 hours, the oxidative treatment may be carried out to the extent that there is a substantial breakdown of the higher molecular weight products resulting in the formation of practical quantities of valuable organic oxy-compounds as carboxylic acids, hydroxy-carboxylic acids, ketones, aldehydes and the like.

Thus, it is seen that my process may be executed to obtain heavy oils, synthetic resins and resinous materials suitable as raw materials for the manufacture of waterproof lacquers, varnishes, paints and other coating materials, for the manufacture of films, discs, threads, joining or binding materials and the like, in addition said products may be useful as flotation oils, wetting agents, emulsifiers, disemulsifiers and the like. The oxy-compounds obtainable in accordance with the invention are useful as solvents, extractant agents, wetting agents, etc., and they are useful raw materials for a wide variety of purposes. They may also be used for improving the oiliness of lubricants.

When the oxidative treatment has proceeded to the desired extent, the resultant reaction mixture may be treated in any suitable convenient manner to remove and recover unreacted reactants, solvents, diluents, products, etc. When the invention is executed to obtain high boiling resins and resinous materials, the reaction mixture may be treated by distillation and/or selective extraction to recover the product or products or obtain said products in the desired concentration in the solvent or mixture of reactants. If desired the reaction mixture may be neutralized to terminate the action of the acid-acting catalyst, if any is present, or any other acidic materials formed during the reaction. Various water soluble alkalies, as the alkali and alkaline earth metal oxides, hydroxides, carbonates, bicarbonates, etc., as well as ammonia, are suitable neutralization agents. After the neutralization treatment, the products may be recovered by steam distillation, distillation under normal or reduced pressure and the like means.

The following specific examples illustrate suitable modes of executing the invention. It is to be understood that the invention is not to be regarded as limited to the specific reactants, catalysts or modes of operation disclosed in the examples.

*Example I*

About 1 part by weight of butadiene and about 3 parts by weight of toluene were charged to a reaction vessel equipped with mechanical stirring means and means for heating its contents. About 0.11 part by weight of $AlCl_3$ was added to the stirred mixture while the temperature was maintained at about 40° C. until the reaction was substantially complete. A part of the resulting resinous product was tested and found to have a melting point of about 19° C. as determined by the Kraemer-Sarnow method. The resinous material was then heated to and maintained at a temperature of about 170° C. for about 45 hours while air was passed through it. At the end of this time, the resulting resinous material was tested. It was found that it had a melting point of about 49° C. (K. S. method).

About 1 part by weight of the resinous material was found to be entirely miscible with about 2 parts by weight of stand-oil (heated linseed oil) on heating the mixture to a temperature of about 280° C. for about 25 minutes. The resulting solution gave a substantially waterproof lacquer.

While the resinous material prior to the treatment with air at 170° C. was also soluble in stand-oil under like conditions, the resulting solution could not be made into a waterproof lacquer.

*Example II*

A synthetic resinous material having a K. S. melting point of about 22° C. was prepared by reacting about 1 part by weight of butadiene with about 1 part by weight of isobutylene in the presence of $AlCl_3$ at a temperature of about 40° C. This resinous material could only be dissolved to a very limited extent in stand-oil even on heating to a temperature of about 280° C. for a considerable period of time. Considerably less than 1 part by weight of the resinous material was soluble in about 2 parts by weight of the heated stand-oil. Lacquers made from the resultant solution were not sufficiently waterproof to be of any practical value.

It was found that by treating the resinous material having a melting point of about 22° C. with air at a temperature of about 170° C. for about 45 hours, a resinous material having a K. S. melting point of about 76° C. was obtained. This oxygen-treated resinous material was entirely miscible with stand-oil in the proportion of 1 part of resinous material to 2 parts of stand-oil, and the resulting solution yielded a very satisfactory waterproof lacquer.

*Example III*

A benzine fraction obtained by distillation of a hydrocarbon mixture resulting from the vapor phase cracking of paraffin wax was subjected to a polymerization treatment in the presence of an $AlCl_3$ catalyst. The resulting polymerization product was a synthetic lubricating oil having an Engler viscosity at 50° C. of about 10. This synthetic lubricating oil was heated to a temperature of about 170° C. while air was passed through it at an average rate of about 10 liters per hour for more than two hundred hours. At the end of this time the treated oil was subjected to two successive saponification treatments. Each saponification treatment consisted of boiling the treated oil under reflux for about six hours with a 1N solution of KOH in methyl alcohol. In each treatment about 2 liters of the 1N methyl alcoholic potash solution were used per kilogram of the treated oil. Following the saponification treatment, the mixture was diluted by the addition of methyl alcohol, and the mixture was allowed to stratify. The methyl alcohol layer was separated, neutralized with $H_2SO_4$, and extracted with pentane. The pentane extractant solution was washed with an aqueous methyl alcohol solution, dried with anhydrous calcium chloride, filtered and distilled. When the pentane had been distilled from the mixture, the residue in the still was a yellow colored viscous oil consisting for the most part of higher molecular weight hydroxy-carboxylic acids. The yield of the hydroxy-carboxylic acids was more than 20% by weight of the lubricating oil treated.

It was found that the alkaline soaps of the resulting hydroxy-carboxylic acids are excellent emulsifying agents of particular value as agents for the formation of oil-in-water and water-in-oil emulsions.

The above example is illustrative of a suitable means of executing the invention to obtain valuable organic oxy-compounds from the higher molecular weight polymerization and/or condensation products of unsaturated hydrocarbons. The oxidation treatment whereby a part of the higher molecular weight products is converted to oxy-compounds may be effected during or subsequent to the formation of said higher molecular weight products.

While I have described my invention in a detailed manner and indicated suitable means of executing the same, it is to be understood that modifications may be made and that no limitations other than those imposed by the scope of the appended claims are intended.

I claim as my invention:

1. A process for the production of valuable products from unsaturated organic compounds which comprises reacting a conjugated double bond diolefine with a hydrocarbon fraction containing olefines and aromatic hydrocarbons in the presence of an inorganic acid-acting halide catalyst at a temperature at which the unsaturated compounds combine to form higher molecular weight hydrocarbon products, and treating said hydrocarbon products with oxygen at a temperature greater than about 100° C. for from about 30 hours to about 200 hours.

2. A process for the production of valuable products from unsaturated organic compounds which comprises reacting a conjugated double bond diolefine with an aromatic hydrocarbon in the presence of an acid-acting metallic halide catalyst at a temperature of from about 20° C. to about 60° C., and treating the resulting higher molecular weight hydrocarbon product with oxygen at a temperature greater than about 100° C. for from about 30 to about 50 hours.

3. A process for the production of valuable synthetic resins and resinous materials useful in the manufacture of waterproof coating compositions which comprises reacting butadiene with toluene in the presence of aluminum chloride at a temperature of from about 20° C. to about 60° C., and treating the resulting higher molecular weight hydrocarbon product with air at a temperature of about 170° C. for about 45 hours.

4. A process for the production of valuable products from unsaturated organic compounds which comprises reacting a conjugated double bond diolefine with an olefine in the presence of an acid-acting metallic halide catalyst at a temperature of from about 20° C. to 60° C., and treating the resulting higher molecular weight hydrocarbon product with oxygen at a temperature greater than about 100° C. for at least 30 hours.

5. A process for the production of valuable synthetic resins and resinous materials useful in the manufacture of waterproof coating compositions which comprises reacting butadiene with isobutylene in the presence of aluminum chloride at a temperature of from about 20° C. to about 60° C., and treating the resulting higher molecular weight hydrocarbon product with air at a temperature of about 170° C. for about 45 hours.

6. A process for the production of higher molecular weight hydroxy-carboxylic acids which comprises treating a benzine hydrocarbon fraction with aluminum chloride at a temperature at which higher molecular weight hydrocarbons are formed at a practical rate, and treating the resulting product with air at a temperature of about 170° C. for more than about 200 hours.

7. A process for the production of valuable products from a hydrocarbon mixture containing as essential ingredients a diolefine, an olefine and an aromatic hydrocarbon which comprises subjecting such a mixture to the action of a metallic halide catalyst at a temperature at which the unsaturated compounds combine to form a high molecular weight hydrocarbon polymer product, and subjecting the polymer product to treatment with oxygen at a temperature greater than about 100° C. for at least 30 hours whereby at least partial oxidation is effected.

8. A process for the production of valuable products from unsaturated organic compounds which comprises reacting a conjugated double bond diolefine with an aromatic hydrocarbon in the presence of a metallic halide catalyst at a temperature at which the unsaturated compounds react to form a high molecular weight hydrocarbon polymer product, and subjecting the polymer product to treatment with oxygen at a temperature of from about 100° C. to 200° C. for from about 30 to about 200 hours whereby at least partial oxidation is effected.

9. A process for the production of valuable high molecular weight organic oxy-compounds from a hydrocarbon mixture containing as essential ingredients a diolefine, an olefine and an aromatic hydrocarbon which comprises subjecting such a mixture to the action of a metallic halide catalyst at a temperature of from about 20° C. to about 60° C., separating the resulting high molecular weight polymer product, and subjecting the polymer product to treatment with oxygen at a temperature of about 170° C. for from 150 hours to 200 hours whereby the polymer product is oxidized to high molecular weight organic oxy-compounds.

10. A process for the production of valuable high molecular weight organic oxy-compounds which comprises reacting a conjugated double bond diolefine with an aromatic hydrocarbon in the presence of a metallic halide catalyst at a temperature of from about 20° C. to about 60° C., separating the resulting high molecular weight polymer product, and subjecting the polymer product to treatment with oxygen at a temperature of about 170° C. for from about 150 hours to 200 hours whereby the polymer product is oxidized to high molecular weight organic oxy-compounds.

11. A process for the production of valuable synthetic resins and resinous materials useful in the manufacture of waterproof coating compositions which comprises reacting a conjugated double bond diolefine with toluene in the presence of aluminum chloride at a temperature of from about 20° C. to about 60° C., and treating the resulting higher molecular weight hydrocarbon product with air at a temperature of about 170° C. for about 45 hours.

12. A process for the production of valuable synthetic resins and resinous materials useful in the manufacture of waterproof coating compositions which comprises reacting butadiene with an aromatic hydrocarbon in the presence of aluminum chloride at a temperature of from about 20° C. to about 60° C., and treating the resulting higher molecular weight hydrocarbon product with air at a temperature of about 170° C. for about 45 hours.

ADRIANUS JOHANNES VAN PESKI.